(12) United States Patent
Gebert

(10) Patent No.: US 7,677,847 B2
(45) Date of Patent: Mar. 16, 2010

(54) SEALING ASSEMBLY FOR A SPINDLE

(75) Inventor: Karl Gebert, Marktbreit (DE)

(73) Assignee: Siemens Aktiengesellschaft, München (DE)

( * ) Notice: Subject to any disclaimer, the term of this patent is extended or adjusted under 35 U.S.C. 154(b) by 995 days.

(21) Appl. No.: 10/948,096

(22) Filed: Sep. 23, 2004

(65) Prior Publication Data

US 2005/0146095 A1 Jul. 7, 2005

Related U.S. Application Data

(63) Continuation of application No. PCT/DE03/01008, filed on Mar. 26, 2003.

(30) Foreign Application Priority Data

Mar. 26, 2002 (DE) .................. 102 13 530

(51) Int. Cl.
*B23C 1/02* (2006.01)
(52) U.S. Cl. .................. 409/231; 137/580; 408/57; 409/135
(58) Field of Classification Search ......... 409/135–137, 409/231–233; 408/56–57, 59; 137/580; 384/480, 481; 277/355; *B23Q 11/12*
See application file for complete search history.

(56) References Cited

U.S. PATENT DOCUMENTS

| 885,032 | A | * | 4/1908 | De Ferranti | 415/173.6 |
|---|---|---|---|---|---|
| 3,211,060 | A | * | 10/1965 | McCann | 409/231 |
| 3,516,149 | A | * | 6/1970 | Mickas | 483/34 |
| 3,955,471 | A | * | 5/1976 | Frazier | 409/233 |
| 4,048,879 | A | * | 9/1977 | Cox | 82/142 |
| RE30,206 | E | * | 2/1980 | Ferguson et al. | 415/173.7 |
| 4,583,892 | A | * | 4/1986 | Armbruckner | 409/136 |
| 4,790,699 | A | * | 12/1988 | Ringel | 409/231 |
| 5,072,948 | A | * | 12/1991 | Kostrzewski | 277/320 |
| 5,140,739 | A | * | 8/1992 | Yamaguchi et al. | 483/18 |
| 5,299,814 | A | * | 4/1994 | Salpaka | 279/157 |
| 5,322,494 | A | * | 6/1994 | Holtey et al. | 483/12 |
| 5,346,341 | A | * | 9/1994 | Jambor | 409/132 |
| 5,378,091 | A | * | 1/1995 | Nakamura | 409/132 |
| 5,474,306 | A | * | 12/1995 | Bagepalli et al. | 277/355 |
| 5,480,165 | A | * | 1/1996 | Flower | 277/355 |
| 5,704,760 | A | * | 1/1998 | Bouchard et al. | 415/170.1 |
| 5,749,584 | A | * | 5/1998 | Skinner et al. | 415/173.5 |
| 5,758,879 | A | * | 6/1998 | Flower | 277/303 |
| 5,782,586 | A | * | 7/1998 | Geissler | 408/56 |

(Continued)

FOREIGN PATENT DOCUMENTS

DE 664 770 C 9/1938

(Continued)

OTHER PUBLICATIONS

Translation of JP-54-114878, USPTO, Dec. 2007.*

*Primary Examiner*—Daniel W Howell
(74) *Attorney, Agent, or Firm*—Henry M. Feiereisen; Ursula B. Day

(57) ABSTRACT

A spindle apparatus includes a housing for rotatable support of a spindle. The spindle is sealed by a brush seal in order to prevent fluid, contained in the housing, from escaping and/or to prevent ingress of a medium from outside into the housing.

7 Claims, 1 Drawing Sheet

U.S. PATENT DOCUMENTS

| | | | |
|---|---|---|---|
| 6,231,047 B1 * | 5/2001 | Cunningham et al. | 277/355 |
| 6,254,344 B1 * | 7/2001 | Wright et al. | 415/231 |
| 6,390,476 B1 * | 5/2002 | Tong et al. | 277/355 |
| 6,517,314 B1 * | 2/2003 | Burnett et al. | 415/173.7 |
| 6,589,012 B2 * | 7/2003 | Burnett et al. | 415/174.2 |
| 6,609,888 B1 * | 8/2003 | Ingistov | 415/231 |
| 6,692,202 B2 * | 2/2004 | Katsuzawa et al. | 409/135 |
| 2005/0234287 A1 * | 10/2005 | Weatherbee | 600/16 |

FOREIGN PATENT DOCUMENTS

| | | | |
|---|---|---|---|
| DE | 197 50 205 A | | 5/1999 |
| EP | 0 757 194 B1 | | 8/2002 |
| JP | 54114878 A | * | 9/1979 |
| JP | 57021217 A | * | 2/1982 |
| JP | 63062638 A | * | 3/1988 |
| JP | 03239409 A | * | 10/1991 |
| JP | 04002438 A | * | 1/1992 |
| JP | 04046704 A | * | 2/1992 |
| JP | 06008103 A | * | 1/1994 |
| JP | 7266101 A | | 10/1995 |
| JP | 9105464 A | | 4/1997 |
| WO | WO 01/13013 A | | 2/2001 |
| WO | WO 2006102782 A1 | * | 10/2006 |

\* cited by examiner

SEALING ASSEMBLY FOR A SPINDLE

CROSS-REFERENCES TO RELATED APPLICATIONS

This application is a continuation of prior filed copending PCT International application no. PCT/DE03/01008, filed Mar. 26, 2003, which designated the United States and on which priority is claimed under 35 U.S.C. §120, the disclosure of which is hereby incorporated by reference, and which claims the priority of German Patent Application, Serial No. 102 13 530.4, filed Mar. 26, 2002, pursuant to 35 U.S.C. 119(a)-(d).

BACKGROUND OF THE INVENTION

The present invention relates, in general, to a sealing assembly for a rotating component, such as a spindle or a shaft, for preventing escape of fluid and/or ingress of contaminants from outside. The present invention further relates to a medium transfer apparatus provided with a sealing assembly according to the present invention for preventing a leakage during transfer of medium into the shaft.

Nothing in the following discussion of the state of the art is to be construed as an admission of prior art.

Rotating components, such as tool spindles, run frequently at high revolutions in order to realize sufficiently high cutting speeds, when small tools are involved for example. Typically, the spindles are lubricated with oil. In particular in the wood working industry, or when machining graphite and other oil-sensitive material or milling pre-finished or finished materials are involved, assurances must be provided to prevent escape of fluids from the spindle because otherwise the workpiece may become contaminated, damaged or even useless. For that reasons tool spindles are provided with primary seals to ensure that no oil escapes. Typically, the primary seals are configured as labyrinth seals which, however, are not entirely leak-free and moreover are characterized by relatively great dimensions. As a result, the cantilever arm between tool tip and the proximal bearing has to be configured long enough, adversely affecting the dynamic properties of the spindle.

Motor spindles also require the arrangement of rotary feedthroughs to enable lubricant to be introduced, as the tool spindle rotates, and to be transported to the installed tool. Seals for such feedthroughs are typically realized as ceramic sealing packs. In particular when high revolutions are involved, sealing packs have, however, only a short service life.

It would therefore be desirable and advantageous to provide an improved spindle apparatus and an improved medium transfer apparatus to obviate prior art shortcomings.

SUMMARY OF THE INVENTION

According to one aspect of the present invention, a spindle apparatus includes a housing, a spindle rotatably supported in the housing, and a sealing assembly, including a brush seal, for sealing the spindle to prevent fluid, contained in the housing, from escaping and/or to prevent ingress of a medium from outside into the housing.

The present invention thus resolves prior art problems by providing a brush seal as primary seal of spindles. Application of brush seals result in a desired sealing action, while the brush seals can be sized shorter in axial direction compared to typical labyrinth seals. Thus, the cantilever arm between the tool tip and the proximal bearing can be configured short so that dynamic properties of the spindle are enhanced. When using spindles as tool spindles, materials can be machined which are sensitive to lubricants. Brush seals ensure a sufficient sealing action to prevent inadmissible entry of media and particles from outside. Thus, demands on high-quality primary seals of tool spindles can be met.

According to another aspect of the present invention, an apparatus for transfer of a medium includes a rotatable shaft for transport of the medium, a medium feed device for supply of the medium to the shaft, and a sealing assembly, including a brush seal, disposed between the shaft and the medium supply device, for preventing a leak during transfer of the medium into the shaft. The use of a brush seal assures a leak-free transfer of liquid and/or gaseous media into the rotating shaft in a simple and improved manner via the rotary feedthrough device.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
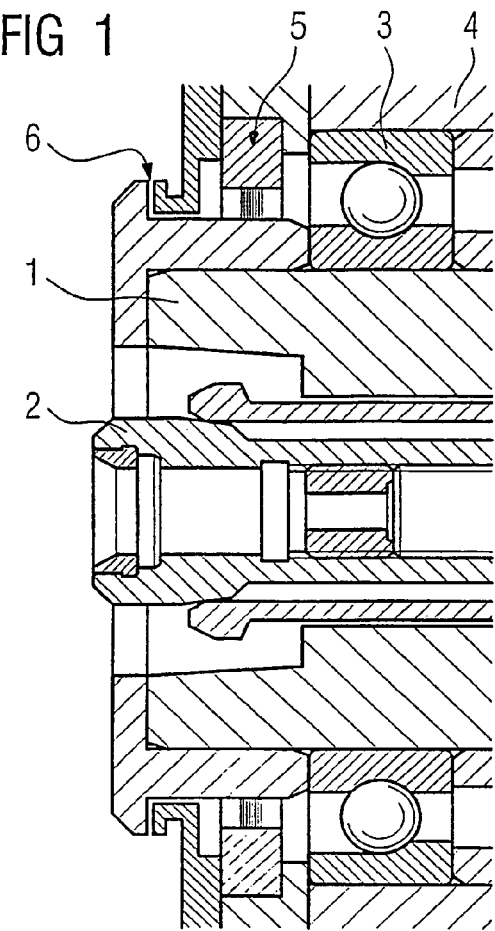
FIG. 1 is a cross sectional view of a spindle head of a tool spindle having incorporated therein the subject matter of the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross sectional view of a spindle head of a tool spindle 1 having incorporated therein the subject matter of the present invention. The tool spindle 1 has a central tool holder 2 and is rotatably supported in a housing 4. Oil is used to lubricate the bearing 3 to improve its running properties. In order to prevent oil from escaping via the tool-side end face of the spindle 1 to the outside, a primary seal in the form of a brush seal 5 is provided. The brush seal 5 seals the housing 4 in relation to the rotating spindle 1 and further seals the bearing 3 against entry of media and particles from outside. In the non-limiting example of FIG. 1, the brush seal 5 is complemented by a secondary labyrinth seal 6, placed adjacent to the brush seal 5, with confronting surfaces of the brush seal 5 and labyrinth seal 6 in immediate contact with one another, as shown in FIG. 1. Structure of such a labyrinth seal is generally known so that further discussion thereof is omitted for the sake of simplicity.

Figure 2:
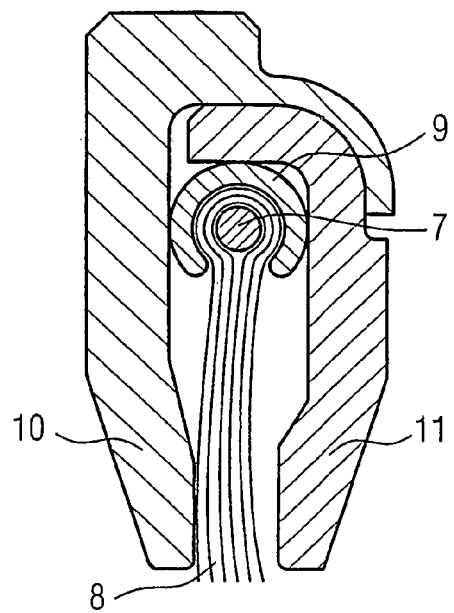
FIG. 2 is a detailed sectional view of a brush seal for use in the tool spindle.

FIG. 2 shows is a detailed sectional view of the brush seal 5, including a steel ring 7 and brush wires 8 which are looped around the steel ring 7 and realized in the form of Kevlar fibers or steel bristles. The brush wires 8 are secured to the steel ring 7 by a clip or clamp 9. The brush seal 5 is received in a ring-shaped housing comprised of a support ring 10 and a cover ring 11. An example of a brush seal of type involved here is described in International PCT application no. PCT/DE00/02621, published Feb. 22, 2001 as WO 01/13013, to which reference is made herewith.

Through suitable material selection for the brush and for the further components of the brush seal 5, a desired sealing gap can be realized during operation. In addition to the material selection, the components of the brush seal 5 can be sized so as to adjust to the lubricant, encountered pressures and temperatures and other factors.

Figure 3:
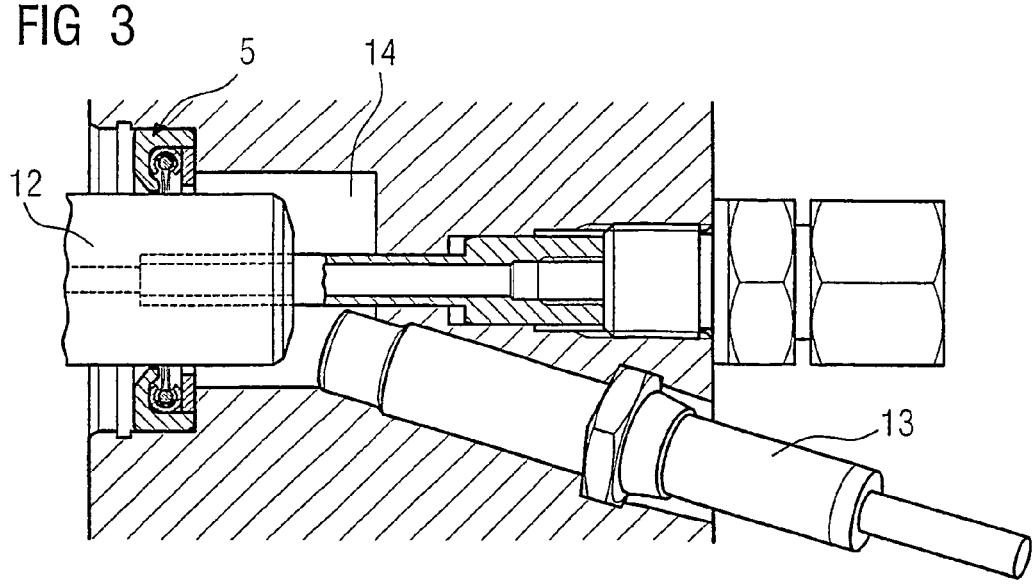
FIG. 3 is a partial cross sectional view of a rotary feedthrough of a tool spindle.

Turning now to FIG. 3, there is shown, by way of example, the incorporation of a brush seal 5 in a rotary feedthrough of a tool spindle for introduction of a medium such as lubricant, e.g., lubricating oil, into a rotating, hollow shaft 12, such as a spindle, for transfer to a tool (not shown). The rotary feedthrough includes a medium feed device 13 for supply of lubricant into a transfer compartment 14 which is in direct communication with the bore of the shaft 12. In order to ensure that the medium flow is routed along a defined path, i.e. only through the bore of the shaft 12, a brush seal 5 is provided and wrapped around the rotating shaft 12. The brush seal 5 assures a transfer of liquid and/or gaseous fluids into the rotating shaft 12 while allowing shifts of the shaft 12 in axial direction as well as oscillations in all directions of space, because the brush seal 5 is indifferent in this respect. In addition, the brush seal 5 is applicable under wet running condition and dry running conditions. A transfer of medium can be realized at extremely high rotation speeds with revolutions of up to 400 m/s.

The arrangement of the brush seal 5 is also advantageous because of the absence of sudden destruction and absence of uncontrolled escape of medium to be transferred. Compared with conventional ceramic seals, the service life is increased by an average of factor 5 to 10.

The rotary feedthrough and the medium transfer area are simple in structure because of the absence of bearings etc. As a result, the number of components is reduced and thus overall costs are decreased.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A spindle apparatus, comprising:
a housing containing oil,
a spindle rotatably supported in the housing and lubricated by oil within the housing,
a brush seal sealing the spindle to prevent oil from escaping and to prevent ingress of liquid fluid from outside into the housing, and
an apparatus for transfer of a medium, with the apparatus including
a rotatable shaft for transport of oil,
a transfer compartment provided at an end surface of the shaft and communicating with an internal bore of the shaft,
a feed device for supply of oil into the transfer compartment for introduction into the internal bore of the shaft, and
a sealing assembly, disposed between the shaft and the feed device, for preventing a leak during transfer of oil from the transfer compartment into the internal bore of the shaft, said sealing assembly including a brush seal and a labyrinth seal positioned adjacent to the brush seal for sealing the spindle.

2. The spindle apparatus of claim 1, wherein the spindle is a tool spindle.

3. The spindle apparatus of claim 1, wherein the sealing assembly constitutes a primary seal of the spindle apparatus.

4. The apparatus of claim 1, wherein the brush seal includes KEVLAR® fibers or steel bristles.

5. The motor spindle of claim 1, wherein the brush seal is wrapped around the spindle and maintains a sealing effect, when the spindle is moved in an axial direction.

6. The spindle apparatus of claim 1, wherein the brush seal and the labyrinth seal have confronting surfaces in immediate contact with one another.

7. The spindle apparatus of claim 1, wherein the shaft rotates at a rotation speed of up to 400 m/s.

* * * * *